Oct. 19, 1943. B. D. McINTYRE ET AL 2,332,161
VARIABLE CONTROL SHOCK ABSORBER
Filed Nov. 26, 1941

INVENTORS
BROUWER D. McINTYRE
CHARLES E. READ
ARTHUR BOOR
BY Whittemore Hulbert & Belknap
ATTORNEYS Patented Oct. 19, 1943

2,332,161

UNITED STATES PATENT OFFICE 2,332,161

VARIABLE CONTROL SHOCK ABSORBER

Brouwer D. McIntyre and Charles E. Read, Monroe, Mich., and Arthur Boor, Toledo, Ohio, assignors to Monroe Auto Equipment Company, Monroe, Mich., a corporation of Michigan Application November 26, 1941, Serial No. 420,562

20 Claims. (Cl. 188—88)

This invention relates generally to shock absorbers and refers more particularly to hydraulic shock absorbers of the direct-acting type.

Heretofore shock absorbers have been provided with a certain amount of resistance to vehicle spring amplitudes and shock absorber movements, but usually there is insufficient resistance to compensate for increase in movements of the shock absorber, or there is no provision to give increased shock absorber resistance for increased vehicle spring amplitudes and shock absorber movements. As a result, the shock absorber does not function properly to obtain a smooth, even ride.

In the present instance, we have overcome the difficulties heretofore encountered by providing a variable control that not only will provide the proper resistance to take care of normal shocks, but will provide increased resistance for increased spring amplitudes and shock absorber movements.

Figures 1, 2, 3:
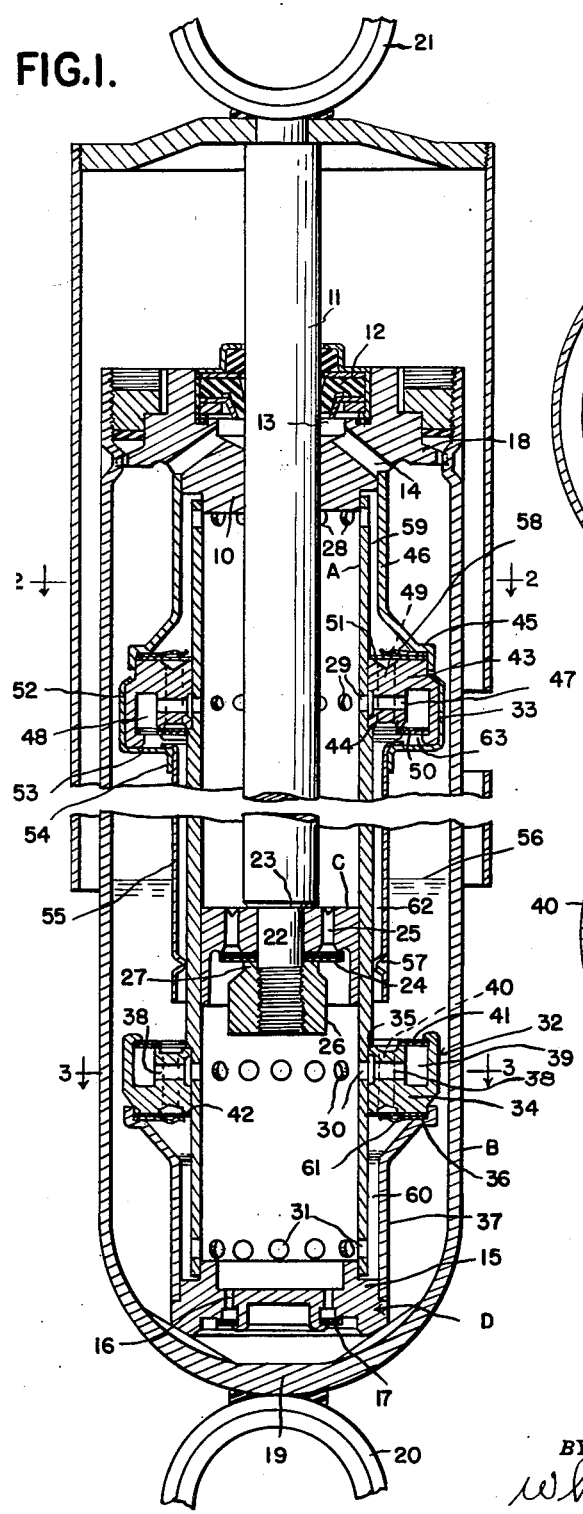
Figure 1 is a side elevation of a shock absorber embodying our invention, with parts broken away and in section.
Figure 2 is a cross sectional view taken substantially on the line 2—2 of Figure 1.
Figure 3 is a cross sectional view taken substantially on the line 3—3 of Figure 1.

Referring now to the drawing, A is the pressure cylinder, B is the reserve chamber, and C is the piston of a hydraulic shock absorber having a variable control embodying our invention.

As shown, the pressure cylinder A has a closure 10 at its upper end apertured to receive a rod 11 for the piston C and has a base compression valve assembly D at its lower end. The closure 10 has a seal 12 preventing the escape of hydraulic medium along the rod 11 to the exterior of the shock absorber, a pocket 13 for receiving the hydraulic medium scraped off the rod 11 by said seal, and a passage 14 for conducting such hydraulic medium from the pocket 13 to the reserve chamber B, while the base compression valve assembly D has a body 15 rigid with the cylinder and provided with a circular series of holes or openings 16, and a laminated spring valve 17 on the underside of the body normally closing the lower ends of said openings.

The reserve chamber B is substantially concentric with the pressure cylinder A and is mounted on an annular enlargement 18 of the closure 10. The lower end 19 of the reserve chamber is closed and is rigid with a suitable head 20 for attachment to the unsprung weight of a vehicle. A similar head 21 is rigid with the outer end of the piston rod 11 and is adapted to be attached to the sprung weight of the vehicle.

The piston C is mounted on the reduced end portion 22 of the rod 11 against a shoulder 23 of the latter and slidably engages the inner walls of the pressure cylinder A. A laminated spring valve 24 is on the underside of the piston and normally closes the lower ends of a circular series of openings 25 in the piston, while a nut 26 threadedly engages the lower end of the rod and has an upward projection 27 bearing against the underside of the spring valve 24. Thus, the piston C and valve 24 are held in proper assembled relation on the rod between the shoulder 23 and nut 26.

In the present instance, the pressure cylinder A is provided at spaced points vertically thereof with four series of openings 28, 29, 30 and 31, respectively, for the hydraulic medium and carries valve assemblies 32 and 33, respectively, for the intermediate series of openings 29 and 30. Preferably the valve assemblies 32 and 33 are identical in construction but are reversed with respect to each other.

The lower valve assembly 32 has an annular body 34 sleeved on the pressure cylinder A against a shoulder 35 thereof and resting upon a shoulder 36 of an annular retaining member 37 carried by the body 15 of the compression valve assembly D. A circular series of spaced passages 38 extend horizontally in the annular body 34 in registration with the openings 30 in the cylinder and are provided at their outer ends with upwardly opening vertical extensions 39, while between the horizontal passages 38 in the body 34 are a circular series of vertically extending open-ended passages 40. A laminated spring valve 41 is mounted on top of the body 34 and normally closes the upper ends of the extension 39, while a spring-pressed disc valve 42 is mounted on the underside of the body 34 and normally closes the lower ends of the passages 40.

The upper valve assembly 33 has an annular body 43 sleeved on the pressure cylinder A against a shoulder 44 thereof and held in place by a shoulder 45 of an annular retaining member 46 carried by the closure 10. A circular series of spaced passages 47 extend horizontally in the annular body 43 in registration with the openings 29 in the cylinder and are provided at their outer ends with downwardly opening vertical extensions 48, while between the horizontal passages 47 in the body 43 is a circular series of vertically extending open-ended passages 49. A laminated spring valve 50 is mounted on the underside of the body 43 and normally closes the lower ends of the extensions 48, while a spring-pressed disc valve 51 is mounted on top of the body 43 and normally closes the upper ends of the passages 49.

52 is an annular bracket encircling and carried by the upper annular body 43 and provided on the underside thereof in spaced relation to the laminated spring valve 50 with an inturned flange 53 terminating in spaced relation to the cylinder A with a downturned flange 54, and 55 is a baffle tube suspended from the flanges 53 and 54 in substantially concentric relation to the cylinder A. Preferably this tube 55 extends downwardly below the normal level 56 of the hydraulic medium to a point adjacent the lower annular body 34, and is provided at spaced points circumferentially thereof adjacent its lower end with embossed portions 57 that bear against the cylinder A to maintain the tube 55 in proper spaced relation thereto.

Thus, from the foregoing, it will be apparent that the upper annular member 46 not only serves to hold the body 43 on the shoulder 44 of the cylinder A and to hold the disc valve 51 and its spring 58 on said body, but also cooperates with the cylinder A to form an annular space or passageway 59 for the hydraulic medium from the passages 49 in the body 43 to the openings 28 in the cylinder. Likewise, the lower annular member 37 cooperates with the cylinder A to form an annular space or passageway 60 for the hydraulic medium from the passages 40 in the body 34 to the openings 31 in the cylinder in addition to holding the lower annular body 34 against the shoulder 35 of the cylinder and holding the disc valve 42 and its spring 61 on the underside of said body 34. The baffle tube 55 cooperates with the cylinder A to provide an annular space or passageway 62 for the hydraulic medium from the reserve chamber to the passages 49 on the down or compression stroke of the piston C, while the flange 53 of the bracket 52 cooperates with the body 43 to provide an annular space or passageway 63 for the hydraulic medium from the valve controlled extensions 48 of the passages 47 to the passageway 62 just mentioned on the up or rebound stroke of the piston. The baffle tube 55 also serves to prevent air above the level 56 of the hydraulic medium in the reserve chamber B from being drawn into the passages 49 in the upper body 43 during the down or compression stroke of the piston.

In use, when easy or boulevard riding conditions are encountered and the shock absorber is moving slowly on the compression stroke, the hydraulic medium will flow from the cylinder A through the openings 30, passages 38 and extension 39 past the valve 41 to the reserve chamber B and will also flow from the latter through the passageway 62, passages 49, passageway 59 and openings 28 into the space within the cylinder A above the piston C. However, should the shock absorber movement increase on the compression stroke to the point where the piston C slides down over and closes the openings 30 in the cylinder due to rougher riding conditions, then the hydraulic medium will flow through the openings 16 in the compression valve assembly past the valve 17 to the reserve chamber B, while the space in the cylinder A above the piston C will continue to be refilled by hydraulic medium supplied thereto through the openings 28 as aforesaid. On the rebound or up stroke of the piston C during easy or boulevard riding conditions, the hydraulic medium will flow from the cylinder A through the openings 29, passages 47, extensions 48 past the valve 50 to the passageways 63 and 62 in the reserve chamber, and will also flow from the reserve chamber B through passages 40 past the valve 42 to the passageway 60 and openings 31 to the space in the cylinder A below the piston C. If rougher riding conditions are encountered on the rebound stroke, then the piston will slide up over and close the openings 29 whereupon the hydraulic medium will flow through the passages 25 in the piston past valve 24 into the space in the cylinder A below said piston. The resistance to the flow or passage of the hydraulic medium afforded by the respective valves mentioned may be varied as desired by increasing or decreasing the number of laminations of the springs thereof, but the construction and arrangement should always be such that heavier resistance is provided during increased shock absorber movement when rougher riding conditions are encountered as distinguished from the resistance provided during slow or short shock absorber movements when easy riding conditions are present so that a variable control is obtained.

What we claim as our invention is:

1. A hydraulic shock absorber having relatively movable parts, one being a pressure cylinder provided at one end thereof with a valve controlled opening for a hydraulic medium and provided at four points longitudinally thereof with openings for a hydraulic medium, and the other part being a piston slidably engaging the inner walls of said cylinder and having a valve controlled opening therethrough, the openings at two of the four points mentioned being in the path of and adapted to be closed by said piston, valves for controlling the flow of hydraulic medium through the openings at the two points just mentioned when not closed by the piston, and valves for controlling the flow of hydraulic medium through the openings at the other two of the four points aforesaid.

2. A hydraulic shock absorber having relatively movable parts, one being a pressure cylinder provided at spaced points longitudinally thereof with four series of openings for a hydraulic medium, and the other being a piston slidably engaging the inner walls of the cylinder and adapted to close two of the four series of openings for the hydraulic medium, the cylinder having a valve controlled opening through which the hydraulic medium is adapted to flow when one of the two series of openings is closed by the piston, and the piston having a valve controlled passage therethrough through which the hydraulic medium is adapted to flow when the other of the two series of openings is closed by the piston.

3. A hydraulic shock absorber having a pressure cylinder provided at spaced points longitudinally thereof with four series of openings for a hydraulic medium, two series being adjacent opposite ends of the cylinder, the other two series being intermediate the first mentioned series, a reserve chamber enclosing the cylinder, two annular bodies on the cylinder, one having valve controlled passages registering with one of the intermediate series of openings and discharging into the reserve chamber, the other having valve controlled passages registering with the other of the intermediate series of openings and discharging into the reserve chamber, each having valve controlled passages for receiving hydraulic medium from the reserve chamber, means for conducting hydraulic medium from the last mentioned passages to the series of openings adjacent opposite ends of the cylinder, a piston slidably engaging the inner walls of the cylinder and adapted to close alternately the intermediate series of openings, the cylinder having a valve controlled opening through which hydraulic medium is adapted to flow to the reserve chamber when one of the intermediate series of openings is closed by the piston, and the piston having a valve controlled passage through which the hydraulic medium is adapted to flow when the other of the intermediate series of openings is closed by the piston.

4. A hydraulic shock absorber having a pressure cylinder provided at spaced points longitudinally thereof with four series of openings for a hydraulic medium, two series being adjacent opposite ends of the cylinder, the other two series being intermediate the first mentioned series, a reserve chamber enclosing the cylinder, two annular bodies on the cylinder, one having valve controlled passages registering with one of the intermediate series of openings and discharging into the reserve chamber, the other having valve controlled passages registering with the other of the intermediate series of openings and discharging into the reserve chamber, each having valve controlled passages for receiving hydraulic medium from the reserve chamber, annular retainers for the annular bodies cooperating with the cylinder to provide passageways for conducting hydraulic medium from the last mentioned passages to the series of openings adjacent opposite ends of the cylinder, a piston slidably engaging the inner walls of the cylinder and adapted to close alternately the intermediate series of openings, the cylinder having a valve controlled opening through which hydraulic medium is adapted to flow to the reserve chamber when one of the intermediate series of openings is closed by the piston, and the piston having a valve controlled passage through which the hydraulic medium is adapted to flow when the other of the intermediate series of openings is closed by the piston.

5. A hydraulic shock absorber having a pressure cylinder provided at spaced points longitudinally thereof with four series of openings for a hydraulic medium, two series being adjacent opposite ends of the cylinder, the other two series being intermediate the first mentioned series, a piston slidably engaging the inner walls of the cylinder and adapted to close alternately the intermediate series of openings, the cylinder having a valve controlled opening through which hydraulic medium is adapted to flow when one of the intermediate series of openings is closed by the piston, and the piston having a valve controlled passage through which the hydraulic medium is adapted to flow when the other of the intermediate series of openings is closed by the piston.

6. A hydraulic shock absorber having a pressure cylinder containing a hydraulic medium and provided at spaced points longitudinally thereof with four series of openings for a hydraulic medium, two series being adjacent opposite ends of the cylinder, the other two series being intermediate the first mentioned series, a reserve chamber enclosing the cylinder and containing a hydraulic medium, two annular bodies on the cylinder, one being above and the other being below the normal level of hydraulic medium in the reserve chamber, the upper body having valve controlled passages registering with one of the intermediate series of openings, a bracket carried by said upper body and cooperating therewith to provide a passageway for receiving hydraulic medium from the valve controlled passages just mentioned, a baffle tube carried by the bracket and cooperating with the cylinder to provide a passageway for receiving hydraulic medium alternately from the passageway aforesaid and from the reserve chamber, said baffle tube extending downwardly in the reserve chamber below the normal level of the medium therein to a point adjacent the lower annular body, the upper body also having valve controlled passages for receiving hydraulic medium from the last mentioned passageway, means for conducting the medium from the last mentioned passages to the series of openings adjacent the upper end of the cylinder, the lower annular body having valve controlled passages registering with the other of the intermediate series of openings and discharging into the reserve chamber, said lower body also having valve controlled passages for receiving hydraulic medium from the reserve chamber, means for conducting the medium from the passages just mentioned to the series of openings adjacent the lower end of the cylinder, a piston slidably engaging the inner walls of the cylinder and adapted to close alternately the intermediate series of openings, the cylinder having a valve controlled opening through which hydraulic medium is adapted to flow to the reserve chamber when one of the intermediate series of openings is closed by the piston, and the piston having a valve controlled passage through which hydraulic medium is adapted to flow when the other of the intermediate series of openings is closed by the piston.

7. A hydraulic shock absorber having a pressure cylinder provided at spaced points longitudinally thereof with four series of openings for a hydraulic medium, two series being adjacent opposite ends of the cylinder, the other two series being intermediate the first mentioned series, a reserve chamber enclosing the cylinder, upper and lower annular bodies on the cylinder, one having valve controlled passages registering with one of the intermediate series of openings and discharging into the reserve chamber, the other having valve controlled passages registering with the other of the intermediate series of openings and discharging into the reserve chamber, each having valve controlled passages for receiving hydraulic medium from the reserve chamber, means for preventing air above the normal level of hydraulic medium in the reserve chamber from entering the uppermost of the last mentioned passages, means for conducting hydraulic medium from the last mentioned passages to the series of openings adjacent opposite ends of the cylinder, a piston slidably engaging the inner walls of the cylinder and adapted to close alternately the intermediate series of openings, the cylinder having a valve controlled opening through which hydraulic medium is adapted to flow to the reserve chamber when one of the intermediate series of openings is closed by the piston, and the piston having a valve controlled passage through which the hydraulic medium is adapted to flow when the other of the intermediate series of openings is closed by the piston.

8. A hydraulic shock absorber having relatively movable parts, one being a pressure cylinder provided at four points longitudinally thereof with openings for a hydraulic medium, and the other part being a piston slidably engaging the inner walls of said cylinder, the openings at two of the four points mentioned being in the path of and adapted to be closed by said piston, valves for controlling the flow of hydraulic medium through the openings at the two points just mentioned when not closed by the piston, and valves for controlling the flow of hydraulic medium through the openings at the other two of the four points aforesaid.

9. A hydraulic shock absorber having a pressure cylinder provided at spaced points longitudinally thereof with four series of openings for a hydraulic medium, two series being adjacent opposite ends of the cylinder, the other two series being intermediate the first mentioned series, a reserve chamber enclosing the cylinder, two annular bodies on the cylinder, one having valve controlled passages registering with one of the intermediate series of openings and discharging into the reserve chamber, the other having valve controlled passages registering with the other of the intermediate series of openings and discharging into the reserve chamber, each having valve controlled passages for receiving hydraulic medium from the reserve chamber, means for conducting hydraulic medium from the last mentioned passages to the series of openings adjacent opposite ends of the cylinder, and a piston slidably engaging the inner walls of the cylinder and adapted to close alternately the intermediate series of openings.

10. A hydraulic shock absorber having a pressure cylinder provided at spaced points longitudinally thereof with four series of openings for a hydraulic medium, two series being adjacent opposite ends of the cylinder, the other two series being intermediate the first mentioned series, a reserve chamber enclosing the cylinder, two annular bodies on the cylinder, one having valve controlled passages registering with one of the intermediate series of openings and discharging into the reserve chamber, the other having valve controlled passages registering with the other of the intermediate series of openings and discharging into the reserve chamber, each having valve controlled passages for receiving hydraulic medium from the reserve chamber, annular retainers for the annular bodies cooperating with the cylinder to provide passageways for conducting hydraulic medium from the last mentioned passages to the series of openings adjacent opposite ends of the cylinder, and a piston slidably engaging the inner walls of the cylinder and adapted to close alternately the intermediate series of openings.

11. A hydraulic shock absorber having a pressure cylinder containing a hydraulic medium and provided at spaced points longitudinally thereof with four series of openings for a hydraulic medium, two series being adjacent opposite ends of the cylinder, the other two series being intermediate the first mentioned series, a reserve chamber enclosing the cylinder and containing a hydraulic medium, two annular bodies on the cylinder, one being above and the other being below the normal level of hydraulic medium in the reserve chamber, the upper body having valve controlled passages registering with one of the intermediate series of openings, a bracket carried by said upper body and cooperating therewith to provide a passageway for receiving hydraulic medium from the valve controlled passages just mentioned, a baffle tube carried by the bracket and cooperating with the cylinder to provide a passageway for receiving hydraulic medium alternately from the passageway aforesaid and from the reserve chamber, said baffle tube extending downwardly in the reserve chamber below the normal level of the medium therein to a point adjacent the lower annular body, the upper body also having valve controlled passages for receiving hylraulic medium from the last mentioned passageway, means for conducting the medium from the last mentioned passages to the series of openings adjacent the upper end of the cylinder, the lower annular body having valve controlled passages registering with the other of the intermediate series of openings and discharging into the reserve chamber, said lower body also having valve controlled passages for receiving hydraulic medium from the reserve chamber, means for conducting the medium from the passages just mentioned to the series of openings adjacent the lower end of the cylinder, and a piston slidably engaging the inner walls of the cylinder and adapted to close alternately the intermediate series of openings.

12. A hydraulic shock absorber having a pressure cylinder provided at spaced points longitudinally thereof with four series of openings for a hydraulic medium, two series being adjacent opposite ends of the cylinder, the other two series being intermediate the first mentioned series, a reserve chamber enclosing the cylinder, upper and lower annular bodies on the cylinder, one having valve controlled passages registering with one of the intermediate series of openings and discharging into the reserve chamber, the other having valve controlled passages registering with the other of the intermediate series of openings and discharging into the reserve chamber, each having valve controlled passages for receiving hydraulic medium from the reserve chamber, means for preventing air above the normal level of hydraulic medium in the reserve chamber from entering the uppermost of the last mentioned passages, means for conducting hydraulic medium from the last mentioned passages to the series of openings adjacent opposite ends of the cylinder, and a piston slidably engaging the inner walls of the cylinder and adapted to close alternately the intermediate series of openings.

13. A hydraulic shock absorber having relatively movable parts, one being a pressure cylinder provided at four points longitudinally thereof with openings for a hydraulic medium, the openings at two of the four points being adjacent opposite ends of the cylinder, the openings at the other two points being intermediate the two points just mentioned, and the other part being a piston slidably engaging the inner walls of said cylinder and having a valve controlled opening therethrough, the outer walls of said cylinder being provided with shoulders adjacent the openings at said intermediate points, the openings at the intermediate points mentioned being in the path of and adapted to be closed by said piston, a reserve chamber enclosing the pressure cylinder, two annular bodies sleeved on the cylinder against said shoulders and having valve controlled passages for conducting a hydraulic medium from the openings at the intermediate points aforesaid to the reserve chamber, said bodies also having other passages for conducting a hydraulic medium from the reserve chamber toward the openings at the two points adjacent the ends of the cylinder, spring pressed valves carried by the bodies for controlling the last mentioned passages, and annular members anchored at opposite ends of the cylinder and cooperating with said cylinder to form passageways for the hydraulic medium from the last mentioned passages in said bodies to the openings at the two points adjacent the ends of the cylinder, said annular members having portions clamping the spring pressed valves against the bodies and holding the latter against the shoulders of the cylinder.

14. A hydraulic shock absorber having relatively movable parts, one being a pressure cylinder provided at four points longitudinally thereof with openings for a hydraulic medium, the openings at two of the four points being adjacent opposite ends of the cylinder, the openings at the other two points being intermediate the two points just mentioned, and the other part being a piston slidably engaging the inner walls of said cylinder and having a valve controlled opening therethrough, the openings at the intermediate points mentioned being in the path of and adapted to be closed by said piston, a reserve chamber enclosing the pressure cylinder, two annular bodies mounted on the cylinder and having valve controlled passages for conducting a hydraulic medium from the openings at the intermediate points aforesaid to the reserve chamber, said bodies also having other valve controlled passages for receiving a hydraulic medium from the reserve chamber, and means for conducting the hydraulic medium from the second mentioned valve controlled passages to the openings at the two points adjacent the ends of the cylinder.

15. A hydraulic shock absorber having relatively movable parts, one being a pressure cylinder closed at one end and provided at the other end thereof with a valve controlled opening for a hydraulic medium, said cylinder being provided at four points longitudinally thereof between said ends with openings for a hydraulic medium, the openings at two of the four points being adjacent the ends of the cylinder, the openings at the other two points being intermediate the two points just mentioned, and the other part being a piston slidably engaging the inner walls of said cylinder and having a valve controlled opening therethrough, the openings at the intermediate points mentioned being in the path of and adapted to be closed by said piston, a reserve chamber enclosing the pressure cylinder and containing a hydraulic medium, two annular bodies mounted on the cylinder and having valve controlled passages for conducting a hydraulic medium from the openings at the intermediate points aforesaid to the reserve chamber, said bodies also having other valve controlled passages for receiving a hydraulic medium from the reserve chamber, means for conducting the hydraulic medium from the second mentioned valve controlled passages to the openings at the two points adjacent the ends of the cylinder, an annular bracket connected to one of the bodies aforesaid, and a baffle tube connected to the annular bracket and disposed in substantially concentric relation to the cylinder, said tube extending below the normal level of the hydraulic medium in the reserve chamber to a point adjacent the other of said bodies, said tube and bracket cooperating with the cylinder to provide a passageway through which the hydraulic medium may flow from the reserve chamber to one of the valve controlled passages in the first mentioned body, and through which the hydraulic medium may flow from the other valve controlled passage in said first mentioned body to the reserve chamber.

16. A hydraulic shock absorber having a pressure cylinder and a reserve chamber, the pressure cylinder being provided at two points longitudinally thereof with openings through which a hydraulic medium may flow from the pressure cylinder to the reserve chamber and provided at two other points longitudinally thereof with openings through which a hydraulic medium may flow from the reserve chamber to the pressure cylinder, a piston within and slidably engaging the pressure cylinder, the openings at the first mentioned two points of the pressure cylinder being in the path of and adapted to be closed by said piston, valves controlling the flow of hydraulic medium through the openings at the first mentioned two points when not closed by the piston, and other valves controlling the flow of hydraulic medium through the openings at the last mentioned two points.

17. A hydraulic shock absorber having a pressure cylinder and a reserve chamber, the pressure cylinder having at one end thereof a valve controlled opening through which a hydraulic medium may flow from the pressure cylinder to the reserve chamber, said pressure cylinder being provided at two points longitudinally thereof with openings through which hydraulic medium may flow from the pressure cylinder to the reserve chamber and being provided at two other points longitudinally thereof with openings through which hydraulic medium may flow from the reserve chamber to the pressure cylinder, a piston within and slidably engaging the pressure cylinder, said piston having a valve controlled opening therethrough, the openings at the first mentioned two points of the pressure cylinder being in the path of and adapted to be closed by said piston, means controlling the flow of hydraulic medium through the openings at the first mentioned two points when not closed by the piston, and other means controlling the flow of hydraulic medium through the openings at the last mentioned two points.

18. A hydraulic shock absorber having a pressure cylinder provided at spaced points longitudinally thereof with four series of openings for a hydraulic medium, two series being adjacent opposite ends of the cylinder, the other two series being intermediate the first mentioned series, a reserve chamber, two annular bodies on the cylinder, one having valve controlled passages registering with one of the intermediate series of openings and discharging into the reserve chamber, the other having valve controlled passages registering with the other of the intermediate series of openings and discharging into the reserve chamber, each of said bodies having valve controlled passages for receiving hydraulic medium from the reserve chamber, and means cooperating with the cylinder to provide passageways for conducting hydraulic medium from the last mentioned passages to the series of openings adjacent opposite ends of the cylinder.

19. A hydraulic shock absorber having a pressure cylinder and a reserve chamber arranged one within the other, the pressure cylinder being provided at two points longitudinally thereof with openings through which a hydraulic medium may flow from the pressure cylinder to the reserve chamber and provided at two other points longitudinally thereof with openings through which a hydraulic medium may flow from the reserve chamber to the pressure cylinder, a piston within and slidably engaging the pressure cylinder, the openings at the first mentioned two points of the pressure cylinder being in the path of and adapted to be closed by said piston, and bodies carried by the cylinder and having valve controlled passages registering with the openings at the first mentioned two points and discharging into the reserve chamber, said bodies having valve controlled passages for receiving hydraulic medium from the reserve chamber, and means cooperating with the cylinder to provide passageways for conducting hydraulic medium from the last mentioned passages to the openings at the last mentioned two points.

20. A hydraulic shock absorber having a pressure cylinder and a reserve chamber arranged one within the other, the pressure cylinder having at one end thereof a valve controlled opening through which a hydraulic medium may flow from the pressure cylinder to the reserve chamber, said pressure cylinder being provided at two points longitudinally thereof with openings through which a hydraulic medium may flow from the pressure cylinder to the reserve chamber and provided at two other points longitudinally thereof with openings through which a hydraulic medium may flow from the reserve chamber to the pressure cylinder, a piston within and slidably engaging the pressure cylinder, said piston having a valve controlled opening therethrough, the openings at the first mentioned two points of the pressure cylinder being in the path of and adapted to be closed by said piston, bodies carried by the cylinder having valve controlled passages registering with the openings at the first mentioned two points and discharging into the reserve chamber, said bodies having valve controlled passages for receiving hydraulic medium from the reserve chamber, and means cooperating with the cylinder to provide passageways for conducting hydraulic medium from the last mentioned passages to the openings at the last mentioned two points.

BROUWER D. McINTYRE.
CHARLES E. READ.
ARTHUR BOOR.